United States Patent Office 2,955,976
Patented Oct. 11, 1960

2,955,976

NEMATOCIDE

Kenneth L. Godfrey, St. Albans, W. Va., assignor to Monsanto Chemical Company, St. Louis, Mo., a corporation of Delaware No Drawing. Filed Aug. 24, 1955, Ser. No. 530,411

6 Claims. (Cl. 167—22)

This invention relates to the control of parasitic worm life in agricultural soils. More specifically, the invention relates to soil treating methods for the elimination of both endoparasitic nematodes and ectoparasitic nematodes, their eggs and larvae or for minimization of the soil population of said organisms.

The control of nematodes and other parasitic worms in soils is a complex problem because of the paucity of information on the physiology of the worms and the difficulty involved in experimentation with microscopic organisms. It is believed that many toxicants operate by the destruction of vital enzymes within the organism, however, many compounds, known to be capable of reaction with enzymes, are of little effect, because of the impermeable membranes which enclose the eggs, larvae and adult parasitic worms. Some agents are known to penetrate the exterior membranes, but such penetration will not usually kill the organism. The effective toxicant must have both the property of penetrating the resistant coatings and the ability to destroy the organism.

Even compounds which have the requisite properties of penetration and toxicity are frequently useless, because it is necessary that the toxicant be applied to the environment in such a way that it comes into intimate contact with the organism. Furthermore it is necessary that it remain intact in the soil for a substantial period of time to effect a substantially complete kill of parasitic worms. For example, many active compounds are of limited water-solubility and volatility and therefore are difficult to disperse intimately in the soil. Furthermore, compounds of excessive volatility may be evolved from the soil before a sufficient number of the organisms are destroyed.

Even the ability to destroy nematodes and endoparasitic worms in the soil will not definitely characterize a successful soil sterilant. Many compounds toxic to animal life are also phytotoxic, and therefore, if they are to be practicable as parasitic worm toxicants, the phytotoxicity must not be long-lived. The phytotoxic substances either in the form of the substance added or as decomposition residues should be such that they are removed from the soil by evaporation, by rain washing, or by soil bacterial decomposition.

For the reasons set forth above, completely effective agents for nematodes and other parasitic worm life are not generally available. Furthermore, one skilled in the art cannot predict the effectiveness of compounds as practicable toxicants, even though the physical and biological properties of the compounds are well known.

Since a very careful balance of physical and chemical properties is required in order to provide a chemical substance useful in controlling nematodes and other parasitic worms, this invention has for its principal purpose the provision of compounds which have the above described requisite properties. A further purpose of this invention is to provide a useful method of freeing soils from objectionable nematode life. Other purposes of this invention will be evident from the following specification.

In a copending application of Philip H. Santmyer, Serial No. 396,784, filed December 3, 1953, there is described and claimed a nematocidal method involving the use of ethylene polyamines or polyethylene polyamines containing a terminal alkyl radical having from eight (8) to eighteen (18) carbon atoms. These polyamino compounds have the ability of destroying or rendering ineffective vital enzymes of the nematode, and the dependent long chain aliphatic substituent appearing to provide capacity for penetration of the tissues in the nematode's impervious exterior covering. Although the compounds described in the prior copending application are effective agents for controlling nematodes, under many conditions encountered in the field use they have been found to be less effective than was expected from the greenhouse experimentation. The reasons for this may be related to variations in soil temperature, pH of soil, or chemical composition of the soil being treated. Thus a further purpose of this invention is to provide nematocidal compositions which are not subject to soil conditions and which will be active nematocides of general field utility.

It has now been found that the polyamines which are substituted with long chain carboxylic acid groups are more useful in field applications than are the alkyl substituted polyamines, even though the primary screening and greenhouse secondary screening indicate them to be of the same order of magnitude in their effect on nematodes. The new class of effective nematocides may be prepared by the interreaction of a polyethylene polyamine with a high molecular weight aliphatic monocarboxylic acid, for example, the acids having from eight (8) to twenty-two (22) carbon atoms. Suitable polyethylene polyamines are those of the structure

wherein $n$ is an integer from two (2) to six (6). Suitable polyethylene polyamines for the preparation of compounds useful in the practice of this invention are diethylenetriamine, triethylenetetramine, tetraethylenepentamine, higher polyethylene polyamines and mixtures of these.

The reaction products of carboxylic acids and the polyamines are believed to be at least in part comprised of compounds having the structure

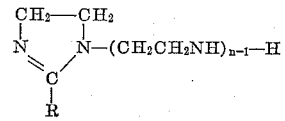

wherein $n$ equals the number of ethylene groups in the polyamine and R is the hydrocarbon radical attached to the carbonyl group of the carboxylic acid.

In view of the lack of certainty with respect to the molecular structure of all of the reaction products, and in view of the fact that many of the carboxylic acids contain other acidic components capable of reaction with the polyamines, the compounds are hereinafter in the specification and in the claims referred to as the reaction product of polyamines and aliphatic carboxylic acids.

Suitable acids for reacting with polyamines are the carboxylic acids which have from eight (8) to twenty-two (22) carbon atoms and may be either saturated or unsaturated including the following: linoleic, linolenic, amylpropiolic, stearolic, palmitolic, hypogeic, elaidic, behenic, erucic, arachidic, stearic, margaric, palmitic, myristic, lauric, capric, brassidic and mixtures of the above acids as are obtained by the saponification of animal and vegetable oils, such as cotton seed oil, linseed oil, stearin, palm oil, whale oil, fish oils, corn oil, tung oil, olive oil, sunflower oil and other naturally occurring animal and vegetable oils of the glycerol ester type. Fatty acid mixtures separated from tall oil are also useful.

In reacting the polyamines with the acids a mixture of substituted products will be found. If equal molar quantities of reactants are used, obviously there will be unreacted polyamines, so most efficient practice involves the use of a slight excess of the acid, for example, from one (1) to two (2) moles of the acid for each mole of polyamine to utilize all of the polyamine. It is not necessary or desirable to separate the various reaction products. Thus the reaction product will differ slightly in its chemical and biological properties from the pure imidazoline described by the structural formula above.

These nematocidal compositions are effective in eliminating or controlling nematode activity when applied to the soil at the rate of 25 to 600 lbs. per acre. Preferred level of application useful in soils of average infestation will be from 100 to 200 lbs. per acre. Obviously, heavily infested areas will require larger quantities and lightly infested areas may be treated effectively with smaller portions. The compositions being water dispersible may be applied by spraying on a cultivated field so as to permit penetration to a substantial depth. More effective methods of distribution of the nematocide may involve the introduction in irrigation water or by injection into the soil by a suitable jet following a plow or harrowing device. Other methods of treating soils with liquid compositions are adaptable for use in the practice of this invention.

In addition to the use in soils, the invention may be practiced in any other nematode environment, for example, greenhouse potting mixtures and other soil substitutes. Nematode environments may include rooted plants, tubers, seeds and bulbs, in which case the toxicant is used as a rinse to remove and destroy eggs, larvae and adult nematodes which may be present.

The above described reaction products of the polyamine are useful in destroying endoparasitic worms other than nematodes which frequently infect barnyards or other areas frequented by domestic animals and fowl. The treatment of the surface soils in such localities will minimize infections of flukes, tapeworms and other helminths in the animal and fowl by destruction of eggs and larvae of the parasites during the soil phase of their life cycles.

The reaction products may be added to the soil in solid formulations, frequently referred to as dusts, which may contain in addition to the active ingredient diluents or extenders to absorb the toxicant and thereby prevent the too rapid dissipation, due to volatility or water-solubility, and dispersing agents to prevent locally excessive concentrations. In addition, these components facilitate the distribution of the active ingredient in soil or soil waters.

Suitable solid diluents are those which render the compositions dry and permanently free-flowing. Thus hygroscopic materials should be avoided. Effective solid diluents are the finely divided carriers, including the clays such as the kaolinites, the bentonites and the attapulgites; other minerals in natural state such as talc, pyrophyllite, quartz, diatomaceous earth, fuller's earth, chalk, rock phosphate and sulfur; and chemically modified minerals, such as acid washed bentonites, precipitated calcium phosphates, precipitated calcium carbonate and colloidal silica. These diluents may represent a substantial portion, for example 50 to 98 percent by weight of the entire formulations. Compositions of this type are useful where there is a tendency for the nematocide to be phytotoxic.

Liquid compositions for nematocidal uses may be solutions or liquid dispersions. The choice of the liquid medium will depend to a great extent upon the physical properties of the active ingredient. If the active component is water-soluble, the liquid compositions may be merely an aqueous solution. Where the active component is insoluble in water or soluble only to a limited extent, it is frequently desirable to add a small amount of an organic solvent which can be readily dispersed in the aqueous medium to produce a heterogeneous dispersion of the active ingredient in water.

A valuable class of nematocidal formulations are those wherein there is present a surface active agent, which serves in providing formulations capable of being uniformly distributed in the soil. The surface active agents may be anionic, cationic, or non-ionic and include conventional soaps, such as the water-soluble salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methyl ethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil.

A useful formulation of the aforementioned reaction products may involve the solid or liquid concentrate of the active ingredient to which has been added formulation aids of conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active components will be prepared. The solid or liquid formulations are preferably applied by mechanical equipment involving spraying or spreading the formulation on soil being treated. For this purpose readily flowable compositions are required, either liquid or solid in physical state. Thus a critical aspect of the invention is the fluent carrier by use of which optimum nematocidal effects can be obtained.

Although the reaction products may be used in the pure state, it appears that more effective utilization of the active component is obtained when formulated with the conditioning agents as described.

Further details of the practice of this invention are set forth by the following specific examples.

Example 1

One mole of triethylenetetramine was heated with 1.3 moles of oleic acid with enough benzene to cause refluxing at about 145° C. Water evolved by the reaction was removed by a Dean-Stark trap and refluxing was continued until substantially 2 moles of water had been eliminated. The benzene was then removed under vacuum leaving a dark liquid product. The reaction product was tested for its toxicity with respect to the nematode *Panagrellus redivivus* in an aqueous suspension. The effect of the oleic acid of triethylenetetramine reaction product was estimated by observing the movement of the organism under a microscope. With a concentration of 0.10 percent the normal flexing motions of the nematode ceased in one-half hour. With a concentration of 0.01 percent, the activity of the nematodes was no longer observed after sixty (60) minutes.

In greenhouse experiments the excellent control of the nematode *Meloidogyne incognita* var. *acreta* was observed with an application at the rate of 200 pounds per acre. Good control was also observed in field tests which did not appear to be affected by soil conditions.

*Example 2*

A reaction product of triethylenetetramine and a mixture of unsaturated fatty acids derived from tall oil was prepared in the manner of Example 1 utilizing a 33 percent molar excess of the unsaturated acids. The mixed product was used in preliminary screening experiments with an aqueous suspension of the nematode *Panagrellus redivivus*. The organisms were completely destroyed in twenty-four hours with a concentration of 0.01 percent and in a greenhouse experiment with the root knot nematodes was found to give excellent control at 200 pounds per acre with no evidence of phytotoxicity.

What is claimed is:

1. A method of inhibiting the parasitic worm life in soils which comprises dispersing in the soil from 25 to 600 lbs. per acre of a product made by heating a mol of at least one ethylene polyamine of the group having the structural formula:

$$H_2N(CH_2-CH_2NH)_n-H$$

wherein $n$ is an integer from 2 to 6 inclusive with more than one mol of at least one of the monocarboxylic acids having the structure:

$$R-\overset{O}{\underset{\|}{C}}-OH$$

wherein R is an aliphatic hydrocarbon group having 8 to 22 carbon atoms.

2. The method of claim 1 wherein the compound is a reaction product of triethylene tetra-amine and a mixture of carboxylic acids derived from tall oil.

3. The method of claim 1 wherein the compound is a reaction product of diethylene triamine and oleic acid.

4. The method of claim 1 wherein the compound is a reaction product of diethylene triamine and a mixture of carboxylic acids derived from tall oil.

5. The method of claim 1 wherein the compound is a reaction product of a mixture of polyamines having the structural formula:

$$H_2N(CH_2-CH_2NH)_n-H$$

wherein $n$ is an integer from 2 to 6 inclusive and oleic acid.

6. The method of claim 1 wherein the compound is a reaction product of a mixture of polyamines having the structural formula:

$$H_2N(CH_2-CH_2NH)_n-H$$

wherein $n$ is an integer from 2 to 6 inclusive and oleic acid and a mixture of monocarboxylic acids derived from tall oil.

References Cited in the file of this patent

UNITED STATES PATENTS

| | | |
|---|---|---|
| 1,947,951 | Neelmeier | Feb. 20, 1934 |
| 1,982,909 | Flint | Dec. 4, 1934 |
| 2,075,044 | Meisenburg | Oct. 13, 1936 |
| 2,377,446 | Payne | June 5, 1945 |
| 2,419,073 | Hammer | Apr. 15, 1947 |
| 2,435,204 | Davidson | Feb. 3, 1948 |
| 2,448,265 | Kagy | Aug. 31, 1948 |
| 2,473,984 | Bickerton | June 21, 1949 |
| 2,502,244 | Carter | Mar. 28, 1950 |
| 2,543,580 | Kay | Feb. 27, 1951 |
| 2,568,876 | White | Sept. 25, 1951 |
| 2,713,582 | Smith | July 19, 1955 |
| 2,726,485 | Thomas | Dec. 13, 1955 |
| 2,730,547 | Dye | Jan. 10, 1956 |
| 2,743,209 | Jones | Apr. 24, 1956 |
| 2,757,117 | Birum | July 31, 1956 |
| 2,770,638 | Giolito | Nov. 13, 1956 |
| 2,779,680 | Wolf | Jan. 29, 1957 |
| 2,794,727 | Barrons | June 4, 1957 |
| 2,802,021 | Heininger | Aug. 6, 1957 |
| 2,802,818 | Wheeler | Aug. 13, 1957 |
| 2,802,831 | Wheeler | Aug. 13, 1957 |

FOREIGN PATENTS

| | | |
|---|---|---|
| 124,387 | Australia | June 12, 1947 |

OTHER REFERENCES

Frear: Chemistry of the Insecticide, Fungicides and Herbicides, 2nd ed., September 1948, pp. 108–122.